United States Patent Office 3,086,020
Patented Apr. 16, 1963

3,086,020
ALKALI AND ALKALINE EARTH METAL 2,4-DI-CHLORO-5-PYRIMIDINE SULFONATE
Karl Seitz, Neuallschwil, Switzerland, assignor to Ciba Limited, Basel, Switzerland, a company of Switzerland
No Drawing. Filed July 6, 1961, Ser. No. 122,115
Claims priority, application Switzerland July 12, 1960
2 Claims. (Cl. 260—251)

This invention provides a process for the manufacture of valuable acylating agents which, unlike those known so far, are soluble and relatively stable in aqueous media. The new acylating agents are obtained when 2:4-dihalogenpyrimidine-5-sulfonic acid halides, especially the 2:4-dichloropyrimidine-5-sulfonic acid chloride or bromide is hydrolyzed selectively to form the corresponding 2:4-dihalogenpyrimidine-5-sulfonic acids.

The selective hydrolysis is performed by reacting a 2:4-dihalogen-pyrimidine-5-sulfonic acid halide, especially the 2:4-dichloropyrimidine-5-sulfonic acid chloride or bromide, with an acid-binding agent, e.g. a water-soluble salt of a weak acid or with a hydroxide or oxide of a metal, for example, a monovalent or divalent metal, especially of an alkali metal, such as sodium, above all lithium, potassium, such as the monopotassium salt of 2:4-dichloropyrimidine-5-sulfonic acid, or an alkaline earth metal, such as the acid calcium salt of 2:4-dichloropyrimidine-5-sulfonic acid. The reaction is performed advantageously in an aqueous medium, e.g. in an aqueous-organic medium or in water, with the use of preferably only slightly more of the acid-binding agent than is required theoretically to replace one halogen atom.

The acid-binding agent to be used as starting material may be primarily a salt of a weak-acid, such as a carbonate or bicarbonate of e.g. a monovalent metal, especially a carbonate or bicarbonate of an alkali metal or alkaline earth metal, or a hydroxide or oxide thereof. The quantity of salt or hydroxide should be so chosen that when the reaction is complete a neutral to slightly alkaline solution is present.

The resulting solutions contain a 2:4-dihalogen, preferably the 2:4-dichloropyrimidine-5-sulfonate of an alkali metal or alkaline earth metal. These solutions can be used as acylating agents for a great variety of purposes, for example, for the manufacture of dyestuffs.

The salts contained in the aqueous solutions of this invention can also be obtained in the form of pastes or solids when they are precipitated from the solutions in which they are formed, for example, with an alkali chloride, isolated by filtration, and if desired, dried. However, it is of advantage to obtain them by evaporating solutions thereof, optionally under reduced pressure at not too high a temperature, e.g. at 10 to 40° C. To preclude decomposition during evaporation, it is advisable to add to the aqueous solution, prior to evaporation, a compound having a neutral to slightly alkaline reaction, especially an inorganic salt or buffer.

By simply dissolving an alkali metal salt of 2:4-dihalogenpyrimidine-5-sulfonic acid in water there is obtained a solution ready for use, for example, in the manufacture of reactive dyestuffs and at the same time for increasing the solubility of the latter as compared to the starting material, and quite generally for use in introducing a reactive nucleus capable of imparting solubility in water into an organic acylatable compound, because the halogen atoms in the reactive salts are very reactive and can both be replaced together or in stages by other groups, as for example, alkoxy or amino groups.

The acylating agents of this invention can also be used e.g. for modifying the tinctorial properties of fiber materials, such as cellulose. Cellulose acylated with such an agent in the presence of alkali in an aqueous medium, for instance, can be given a much deeper shade with a basic dyestuff than unacylated cellulose.

The following example illustrates the invention, the parts being by weight.

Example 21 parts of 2:6-dihydroxy-pyrimidine-5-sulfonic acid chloride, obtained as described in French Patent 1,188,439, granted March 16, 1959, to Armour and Company, by reacting uracil with chlorosulfonic acid, are refluxed with 75 parts of phosphorus oxychloride and 42 parts of phosphorus pentachloride until a clear solution is formed. The phosphorus oxychloride is separated and the resulting 2:6-dichloropyrimidine-5-sulfochloride distilled under reduced pressure. It boils at 140–142° C. under a pressure of 12 mm. Hg. Melting point: 97–99° C.

4.95 parts of 2:6-dichloro-pyrimidine-5-sulfonic acid chloride are dissolved in 100 parts of acetone and stirred into 600 parts of water. By the dropwise addition of N-sodium hydroxide solution, the pH value of the solution is maintained between 6 and 7. Hydrolysis is complete after 2–4 hours when about the theoretical quantity of N-sodium hydroxide solution has been consumed. The clear solution contains the sodium salt of 2:6-dichloro-pyrimidine-5-sulfonic acid and is evaporated to dryness, advantageously at room temperature.

The resulting product can be used for example as follows:

5 parts of dichloro-pyrimidine sulfonic acid (in the form of the sodium salt), 5 parts of sodium carbonate, and 20 parts of urea are dissolved in 100 parts of water. A cotton fabric is padded with the resulting solution, squeezed to a weight increase of 75%, dried, heated to 150° C. for 5 minutes, rinsed and soaped, rinsed again, and dried.

The cellulose so acylated can be dyed deep violet shades with Crystal Violet (0.1 g./l. of the dyestuff of the formula

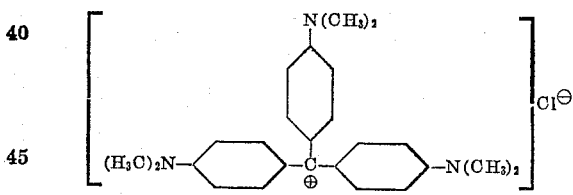

in a dyebath containing 5 cc./l. of acetic acid of 40% strength) at 90–95° C.

The acylating agent can also be used as follows:

8.2 parts of the dyestuff of the formula

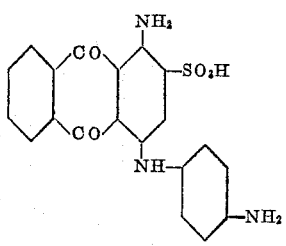

in 300 parts of water are neutralized in 300 parts of sodium carbonate, treated with 6.56 parts of anhydrous sodium acetate, and then acylated with 5.02 parts of the sodium salt of 2:6-dichloro-pyrimidine-5-sulfonic acid. The reaction mixture is heated for some time to 60–65° C. to complete the acylation of the amino group. After cooling, the dyestuff formed is precipitated by the addition of 60 parts of sodium chloride.

The dyestuff so obtained dyes cotton blue shades.

What is claimed is:
1. Mono-metal salt of 2:4-dichloropyrimidine-5-sulfonic acid, in which the metal is a member selected from the group consisting of alkali metals and alkaline earth metals.

2. The sodium salt of 2:4-dichloropyrimidine-5-sulfonic acid.

References Cited in the file of this patent

Khromov-Barisov et al.: Zhur. Obshchei Khim., vol. 27 (1957), pages 2518–21.